United States Patent
Yamazaki

(10) Patent No.: US 6,933,968 B2
(45) Date of Patent: Aug. 23, 2005

(54) IMAGE-SHAKE CORRECTING DEVICE

(75) Inventor: Tatsuya Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/348,994

(22) Filed: Jan. 22, 2003

(65) Prior Publication Data

US 2003/0142218 A1 Jul. 31, 2003

(30) Foreign Application Priority Data

Jan. 25, 2002 (JP) ....................... 2002-016775

(51) Int. Cl.⁷ .................. H04N 5/228; H04N 5/225
(52) U.S. Cl. .................. 348/208.12; 348/208.2; 348/208.5; 348/219.1
(58) Field of Search .............. 396/53; 343/208.99, 343/208.1, 208.2, 208.4, 208.3, 346.53, 208.12, 208.13, 208.14

(56) References Cited

U.S. PATENT DOCUMENTS

| | | | | |
|---|---|---|---|---|
| 5,610,654 A | * | 3/1997 | Parulski et al. | 348/229.1 |
| 5,978,600 A | * | 11/1999 | Takeuchi et al. | 396/53 |
| 6,130,709 A | * | 10/2000 | Sekine et al. | 348/208.8 |
| 6,501,503 B2 | * | 12/2002 | Kudo | 348/208.99 |
| 6,573,930 B2 | * | 6/2003 | Kyuma et al. | 348/208.5 |
| 6,630,950 B1 | * | 10/2003 | Ohkawara et al. | 348/208.12 |

FOREIGN PATENT DOCUMENTS

JP 11183951 * 7/1999 ............ G03B/5/00

* cited by examiner

Primary Examiner—James J. Groody
Assistant Examiner—Lin Ye
(74) Attorney, Agent, or Firm—Cowan, Liebowitz & Latman, P.C.

(57) ABSTRACT

There is provided an image-shake correcting device that is comprised of a detecting unit that detects shakes of the image-shake correcting device, a filter circuit that cuts off low frequency components of a detecting signal output from the detecting unit, a control circuit that controls the filter characteristic of the filter circuit such that the cutoff frequency of the filter circuit increases as the focal distance of the optical image forming unit becomes longer, and a signal processing circuit that executes signal processing for performing an image-shake correcting operation on an image signal output from the optical image forming unit, according to the detection signal having the low frequency components cut off by the filter circuit, to thereby improve the image stabilization characteristic, which is apt to be degraded on the telephoto side of the optical image forming system of the optical image forming unit.

6 Claims, 17 Drawing Sheets

IMAGE-SHAKE CORRECTING DEVICE

BACKGROUND OF THE INVENTION

1. Field of the Invention

The present invention relates to an image-shake correcting device, and more particularly relates to an image-shake correcting device that is suitable for application to image-shake correction in cameras, video cameras, and the like.

2. Description of the Related Art

Conventional systems related to a shake correcting function that is provided in apparatuses such as video cameras include, for example, an electronic shake correcting system that directly detects a shake component of an apparatus by an angular velocity sensor, an angular acceleration sensor, or the like, and employs an image pickup element that has more pixels than standard image pickup elements required by television broadcasting systems so that it is possible to extract preselected areas of the standard size of broadcasting systems from within the entire image pickup area of the image pickup element.

FIG. 13 is a schematic diagram showing an image of the image pickup area of an image pickup element according to the electronic shake correcting system of an image pickup apparatus. In FIG. 13, reference numeral 601 designates the entire image pickup area of the image pickup element, and reference numerals 602 to 604 designate areas of the standard size of television broadcasting systems. When performing no shake corrections, the area 603 positioned in the center of the entire image pickup area 601 is extracted by selecting from the three areas 602 to 604, and thus a video image is output. When performing a correction, an area to be selected from the entire image pickup area 601 is shifted, for example, to the area 602 or the area 604 to output a video image such that a shake of the image is removed according to a signal from a shake detecting means, not shown. There is no limitation on the position of an area to be extracted insofar as the area extracted lies within the entire area 601, and the area can even be extracted from an arbitrary position within the entire area 601, which makes it possible to provide images unaffected by hand shakes.

Another example of shake correcting system is an optical shake correcting system that detects a shake component of an apparatus such as a video camera by the shake detecting means described above, offsets the optical axis using lenses that are movable in the perpendicular direction to the optical axis of the lenses, and thus correct shakes.

FIG. 14 is a diagram showing the configuration of groups of lenses of the optical shake correcting system of an image pickup apparatus. In FIG. 14, reference numeral 801 designates a first group of lenses (a fixed lens) fixed to a lens barrel, reference numeral 802 designates a second group of lenses (a zoom lens) that is movable in the direction of the optical axis to vary the power, reference numeral 803 designates a third group of lenses (a shift lens) that is movable in the direction perpendicular to the optical axis to offset the optical axis, reference numeral 804 designates a fourth group of lenses (a focus compensating lens) that moves in the direction of the optical axis to adjust the focus and correct the shift of the focal plane due to the power being varied, and reference numeral 805 designates a charge coupled device (CCD). The shift lens 803 is driven vertically or horizontally according to an output from the shake detecting means described above, and thus carry out shake correction.

Now, a control method for controlling shake correction will be described. Electronic shake correcting control by the area extraction described above and optical shake correcting control by the shift lens described above are mainly performed by typical hand shake correcting control and panning control. First, the typical hand shake correcting control will be described with reference to FIG. 1.

In FIG. 1, reference numeral 101 designates a lens unit, and reference numeral 102 designates a charge coupled device (CCD). A subject image is formed on the CCD 102 by the lens unit 101, and then photoelectrically converted by the CCD 102. The CCD 102 has more pixels than the standard CCDs required by television broadcasting systems (for example, NTSC (National Television System Committee) system). Reference numeral 104 designates a CCD drive circuit for driving the CCD 102. The CCD drive circuit 104 is designed to be able to select lines with respect to the direction V (the number of lines) shown in FIG. 13 described above, from the lines in the entire image pickup area of the CCD 102 in order to extract an area for a final output, wherein the selection is made upon a control instruction from a microcomputer 119 for camera system control described later.

Reference numeral 601 in FIG. 13, mentioned above, designates the entire image size, and reference numerals 602 to 604 designate examples of the standard image size according to television broadcasting systems. In FIG. 13, when the lines starting from ya+1, which is Δya lines below the uppermost line, are effective for example, the Δya lines are read at a high speed, and thereafter the lines from line ya+1 are read out in the same timing as the case of using a CCD of the standard size with respect to a vertical synchronizing signal. Then, the remaining Δyb lines are read out again at a high speed, thus practically extracting lines of the standard image size with respect to the direction V.

Coming back to FIG. 1, reference numeral 103 designates an analog signal processing section that executes a predetermined process on signals obtained from the CCD 102 to generate analogue image pickup signals. Specific examples of the analog signal processing section 103 are a CDS (Co-related Double Sampling) circuit, and an AGC (Automatic Gain Control) circuit. Reference numeral 106 designates a line memory that can store a digital image pickup signal for one line at least, under the control of a memory control circuit 107. Further, pixels can be read out from a predetermined address in the line memory 106, under the control of the memory control circuit 107. Reference numeral 105 designates a camera signal processing section that has a built-in A/D converter and performs processing of digital signals to generate final output video signals. A digital image pickup signal stored in the line memory 106 includes more pixels than the standard image size of the CCD 102, keeping the large number of pixels. The memory control circuit 107 is designed to be able to select a top pixel to be read from the line memory 106, and to read pixels for the standard image size, upon a control instruction from a camera system control microcomputer 119, described in the following.

Reference numeral 119 designates the camera system control microcomputer that performs control of the entire camera system including control of the CCD drive circuit 104, exposure control, white-balance control, variable power lens control, auto focus control, and image stabilizing control. However, in FIG. 1, only a portion of these functions associated with shake correction is shown for brevity. Shake detection is performed with respect to the two axes in the pitch (vertical) direction and the yaw (horizontal) direction. Since the same control is performed for the two axes, FIG. 1 shows the control only for one axis. Reference numeral 111 designates an angular velocity sensor for detecting shakes of the image pickup apparatus. Reference numeral 112 designates a HPF (High Pass Filter) for cutting the DC component of angular velocity signals output from the angular velocity sensor 111. Reference numeral 113 designates an amplifier for amplifying angular velocity signals detected by the angular velocity sensor 111.

Reference numeral 114 designates an A/D converter incorporated into the camera system control microcomputer 119, which converts the angular velocity signals for the two directions described above into digital signals to be used as angular velocity data. Further, a HPF 115 and a phase compensating filter 116 execute predetermined signal processes on this angular velocity data. The angular velocity data passes through a variable HPF 117, which is variable in cutoff frequency (hereinafter referred to as 'the HPF cutoff frequency'). Then, an integrator 118 generates shake correction signals for the vertical and horizontal directions. Reference numeral 120 designates a correction system controller which transmits the shake correction signals for the vertical direction to the CCD drive circuit 104 and transmits the shake correction signals for the horizontal direction to the memory control circuit 107. As mentioned before, the CCD drive circuit 104 and the memory control circuit 107 change the position for extracting lines from the entire image size of the CCD 102, according to the respective shake correction signals.

Through the above-mentioned series of operations, areas of the standard image size, as designated by reference numerals 602 or 604 for example, can be extracted, as described above, from the entire image size 601 of the CCD 102 with a deviation from the center, as described above, thereby making it possible to correct shakes caused by hand shakes or the like.

When an electronic shake correction by extraction of areas or an optical shake correction by a shift lens, described above, is carried out, a correcting section is provided at a stage subsequent to the zoom lens. In the arrangements of the above two systems, the correction amount for the same amount of shake needs to be corrected correspondingly to a change in the focal distance when the focal distance is changed by a shift of the zoom lens. The reason for this will be explained: Taking an example of a case using a zoom lens with a variable power of 10, if the zoom lens is shifted at its wide end (the end for the longer focal distance) by the same amount as a shift at the telephoto end (the end for the longer focal distance) that requires a shake correction of 0.3 degrees, the resulting shake correction amount at the wide end (the end for the shorter focal distance) is equivalent to 3.0 degrees. A correction method of correcting the correction amount according to the focal distance will be described below, by referring to the case that an electronic shake correction by area extraction is carried out.

Coming back to FIG. 1, reference numeral 121 designates a lens system controller in the camera system control microcomputer 119 that performs control of driving the zoom lens and the focus lens in the lens unit 101, control of autofocus, and the like. The lens system controller 121 controls a zoom motor 109 through a motor driver 108 and shifts the zoom lens to vary the power. Conventionally, a stepping motor has been used as the zoom motor, whereby the position of the zoom lens is detected by drive pulses generated for driving the motor. When a DC motor or a linear motor is used as the zoom motor, the position of the zoom lens can be detected by an encoder which is provided for this purpose. The current focal distance of the zoom lens is recognized from information on the detected position of the zoom lens.

The correction system controller 120 performs correction in response to an output from the integrator 118 and according to the focal distance based on focal distance information detected by the lens system controller 121, and thus calculates a final correction amount. The correction system controller 120 transmits this final correction amount to the CCD drive circuit 104 and the memory control circuit 107, as mentioned before, carry out shake correction. In the above described way, stable hand shake corrections can be achieved irrespective of the focal distance.

Next, panning control will be described. When a photographer carries out panning or tilting of an image pickup apparatus, it is desirable that an image moves as the photographer intends. However, when a normal shake correction is performed during panning, the image does not move due to a shake correction at the beginning of panning, and suddenly starts moving when the shake goes out of the possible shake correction range, giving a sense of discontinuity to the motion of the image. Also, the image gets fixed to a correction limit at the end of panning (getting fixed to a correction limit means a state that the extracting area is fixed to a peripheral edge of the entire image pickup area of the CCD in the electronic shake correction by area extraction, or a state that the shift lens cannot be shifted any more in the lens barrel in the optical shake correction by the shift lens), making shake corrections impossible to carry out.

Panning control is carried out to avoid the above phenomena. Panning control is implemented, for example, such that when an output from the above-mentioned integrator 118 goes out of a predetermined correction range, the cutoff frequency of the variable HPS 117 is changed so that low frequency components are removed, and thus the correction amount is restricted. This panning control makes a shake correction signal indicative of a position close to the center position of the entire image pickup area during panning, which solves the problem described above.

FIG. 15 is a diagram showing the relationship between the output from the integrator and the HPF cutoff frequency in panning control of the image pickup apparatus. In FIG. 15, reference numeral 301 represents a change in the HPF cutoff frequency that corresponds to a change in the output from the integrator. When the output from the integrator exceeds a set value NA, the HPF cutoff frequency is changed as shown in the figure, according to the amount by which the output from the integrator exceeds the set value NA. Further, when the output from the integrator exceeds a set value NB, the gradient of the change in the HPF cutoff frequency is set larger for a greater restriction. In FIG. 15, the ordinate logarithmically represents the HPF cutoff frequency. In this way, the HPF cutoff frequency is changed according to the value of the output from the integrator to restrict the correction amount when panning is performed.

In FIG. 15, reference numeral 303 represents a change in the HPF cutoff frequency at the telephoto end of the zoom lens, and reference numeral 302 represents a change in the HPF cutoff frequency in the vincity of the telephoto end. In the vincity of the telephoto end, the panning speed generally drops. Accordingly, the changing point of the HPF cutoff frequency is shifted, as shown by reference numerals 302 and 303, to the lower side of the output from the integrator for easier transition to panning control, thereby restraining the above described disadvantage during panning.

FIG. 16 is a flowchart showing a panning control process executed by the image pickup apparatus. The panning control process will be described below with reference to FIG. 16. In FIG. 16, in step S1001 it is determined whether the position of the zoom lens is greater than a predetermined value or not. The zoom lens in FIG. 1 described above is shifted by the stepping motor (zoom motor) 109, wherein the zoom lens position is indicated by the number of drive pulses for the stepping motor 109 when it is assumed that the zoom lens position is zero at the wide end. The comparison in step S1001 is for determining whether the zoom lens position is in the vincity of the telephoto end.

FIG. 17 is a diagram showing the relationship between the zoom lens position and the focal distance of the image pickup apparatus. If this relationship is prepared, for example, as table data, a focal distance can easily be obtained by detecting the zoom lens position. If the zoom lens position is greater than the predetermined value in step S1001 described above, in other words, if the zoom lens position is in the vincity of the telephoto end or the focal distance is long, then a predetermined value A and a predetermined value B which are respectively represented by symbol A and symbol B in FIG. 15, described above, are calculated in step S1002. The calculation is carried out as follows.

Provided that set values at the telephoto end of the zoom lens are designated by TA and TB, and set values at a zoom lens position equal to or below the above-mentioned predetermined value by NA and NB, the changing points A and B of the HPF cutoff frequency corresponding to the current zoom lens position are calculated according to the following equations:

$A=(TA-NA)\times$(number of all pulses−current number of pulses)/ (number of pulses in cutoff frequency changing region)$+TA$ (1)

$B=(TB-NB)\times$(number of all pulses−current number of pulses)/ (number of pulses in cutoff frequency changing region)$+TB$ (2).

If the zoom lens position is equal to or below the predetermined value in step S1001, then the predetermined values A and B are respectively set to NA and NB in step S1003. Next, the absolute value of the output from the integrator is compared with the predetermined value B in step S1004. If the absolute value of the output from the integrator is greater than the predetermined value B in step S1004, then the HPF cutoff frequency is calculated in step S1005.

As the calculation of the HPF cutoff frequency, the HPF cutoff frequency practically used is calculated as index data that corresponds to the HPF cutoff frequency to be set. This index data is specified as table data as shown in FIG. 18A. The table data in FIG. 18A is shown in a graph in FIG. 18B. By determining appropriate index data from the index data shown in FIG. 18A and FIG. 18B, a corresponding HPF cutoff frequency is set. Thus, in step S1005, the above appropriate index data is calculated. In step S1005, k1 represents a gradient from the predetermined value A to the predetermined value B, and k2 represents a gradient for values greater than the predetermined value B in FIG. 15.

If the absolute value of the output from the integrator is equal to or below the predetermined value B in step S1004 described above, then the absolute value of the output from the integrator is compared with the predetermined value A in step S1006. If the absolute value of the output from the integrator is greater than the predetermined value A instep S1006, then index data is calculated in step S1007 in the same manner as in step S1005. If the absolute value of the output from the integrator is equal to or below the predetermined value A instep S1006, then the index data is set to 0 for normal control in step S1008. In step S1009, the HPF cutoff frequency that corresponds to the calculated index data is set. By the operation described above, the HPF cutoff frequency during panning is set and panning control is performed, with the focal distance taken into account.

Although the method of changing the HPF cutoff frequency for panning control has been described above, a similar control is also possible by changing the integration constant of the integrator 118.

However, there is the following problem with the above described prior art. That is, in recent years, lenses with increased magnification have come to be mounted in image pickup apparatuses such as video cameras and hence the focal distance at the telephoto end has been greatly extended. However, the longer the focal distance of the lens, the narrower the correction angle during electronic image stabilizing control. The correction amount that determines the position the area to be extracted from the entire area of the CCD is calculated according to the following equation:

Focal distance×tan (correction angle)=correction amount. (3)

It is to be understood from this expression that the longer the focal distance, the greater the correction amount for the same correction angle.

On the other hand, the maximum correction amount from the center position can be represented by (number of effective pixels of CCD−number of extracted pixels)× unit cell size÷2 (4)

As an example, the case of performing electronic image stabilizing control by extracting an area equivalent to ⅕ inches (290,000 effective pixels) from a ¼ inch CCD having 420,000 effective pixels will be discussed below. The unit cell size of this CCD in the vertical direction is 4.70 μm. With regard to lenses with a focal distance of 4.2 mm at the wide end for example, the correction angles for the vertical direction of a lens with a magnification ratio of 10and a lens with a magnification ratio of 25 are calculated to be 0.3 degrees and 0.12 degrees, respectively. If the magnification ratio is yet greater, the correction angle is further narrower.

In the electronic shake correction by area extraction, if the correction angle is narrow as described above, the image gets fixed to a correction limit (the state that the extracting area gets fixed to a peripheral edge of the entire image pickup area of the CCD) even during normal control, which is not shake correction or panning, and accordingly the phenomenon that image stabilization is not obtained is apt to occur. There is also a problem during panning that the extracting position immediately shifts to a correction limit even if conventional panning is carried out. To prevent the image from being fixed to the correction limit using the characteristics of the panning control described in the conventional as it is, the relationship between-the output from the integrator and the HPF cutoff frequency is required to have a characteristic indicated by a dot-line in FIG. 19, which keeps a panning control state all the time, thus causing a problem that the stabilization characteristic is degraded even upon a slight hand shake.

Also, in the case of performing optical shake correction using a shift lens, if the lens is miniaturized at the sacrifice of the correction angle due to miniaturization of the main body of a video camera, there is also a problem that image stabilization is apt to be ineffective as well.

This gives rise to a disadvantage that images picked up by such an image pickup apparatus, a video camera for example, give a very strange feeling as in the case where no panning control is carried out.

SUMMARY OF THE INVENTION

It is an object of the present invention to provide an image-shake correcting device that is designed to solve the above described problems and is capable of performing satisfactory shake correction even if the correction angle is greatly decreased due to high magnification of the lens.

To attain the above object, in a first aspect of the present invention, there is provided an image-shake correcting device comprising an optical image forming unit that forms an image, a detecting unit that detects a shake of the image-shake correcting device, a filter circuit that cuts off low frequency components of a detection signal output from the detecting unit, a control circuit that controls a filter characteristic of the filter circuit such that a cutoff frequency of the low frequency components cut off by the filter circuit increases as a focal distance of the optical image forming unit becomes longer, and a signal processing circuit that carries out signal processing for performing an image-shake correcting operation on an image signal output from the optical image forming unit, according to the detection signal having the low frequency components cut off by the filter circuit.

With the above arrangement according to the first aspect, the cutoff frequency of the filter circuit is controlled to increase as the focal distance of the optical image forming unit becomes longer. As a result, it is possible to avoid the phenomenon that an extracting area gets fixed to a correction limit that is a peripheral edge of the entire image pickup area of the image pickup element and consequently image stabilization cannot be reliably achieved.

To attain the above object, in a second aspect of the present invention, there is provided an image-shake correcting device comprising an optical image forming unit that forms an image, a detecting unit that detects a shake of the image-shake correcting device, a filter circuit that cuts off low frequency components of a detection signal output from the detecting unit, a producing circuit that produces a maximum correction angle for correcting an image shake, according to a focal distance of the optical image forming unit, a control circuit that controls a filter characteristic of the filter circuit such that a cutoff frequency of the low frequency components cut off by the filter circuit increases as the maximum correction angle produced by the producing circuit becomes smaller while it is below a predetermined angle, and a signal processing circuit that carries out signal processing for performing an image-shake correcting operation on an image signal output from the optical image forming unit, according to the detection signal having the low frequency components cut off by the filter circuit.

With the above arrangement according to the second aspect, the filter characteristic of the filter circuit is controlled such that the cutoff frequency of the low frequency components cut off by the filter circuit increases as the maximum correction angle produced by the producing circuit becomes smaller while it is below the predetermined angle. As a result, it is possible to avoid the phenomenon that an extracting area gets fixed to a correction limit that is a peripheral edge of the entire image pickup area of the image pickup element (a state that the shift lens cannot be shifted any more in the lens barrel) and consequently image stabilization cannot be reliably achieved.

Preferably, the image-shake correcting device according to the first or second aspect comprises an image pickup element that converts an image formed by the optical image forming unit into an electrical signal, and a signal control circuit that controls the electrical signal according to the signal processing carried out by the signal processing circuit.

Preferably, the image-shake correcting device according to the first or second aspect comprises an optical correcting unit that corrects an image shake, and a drive control unit controls driving of the optical image forming unit according to the signal processing carried out by the signal processing circuit.

The above and other objects of the invention will become more apparent from the following drawings taken in conjunction with the accompanying drawings.

BRIEF DESCRIPTION OF THE DRAWINGS

FIG. 18A and FIG. 18B are diagrams showing index data that correspond to the HPF cutoff frequency of the image pickup apparatus, wherein FIG. 18A is a diagram showing a list of table data of the index data, and FIG. 18B is a diagram showing a graph of the table data.

DETAILED DESCRIPTION OF THE PREFERRED EMBODIMENTS

The present invention will now be described in detail below with reference to the accompanying drawings showing preferred embodiments thereof.

Figure 1:
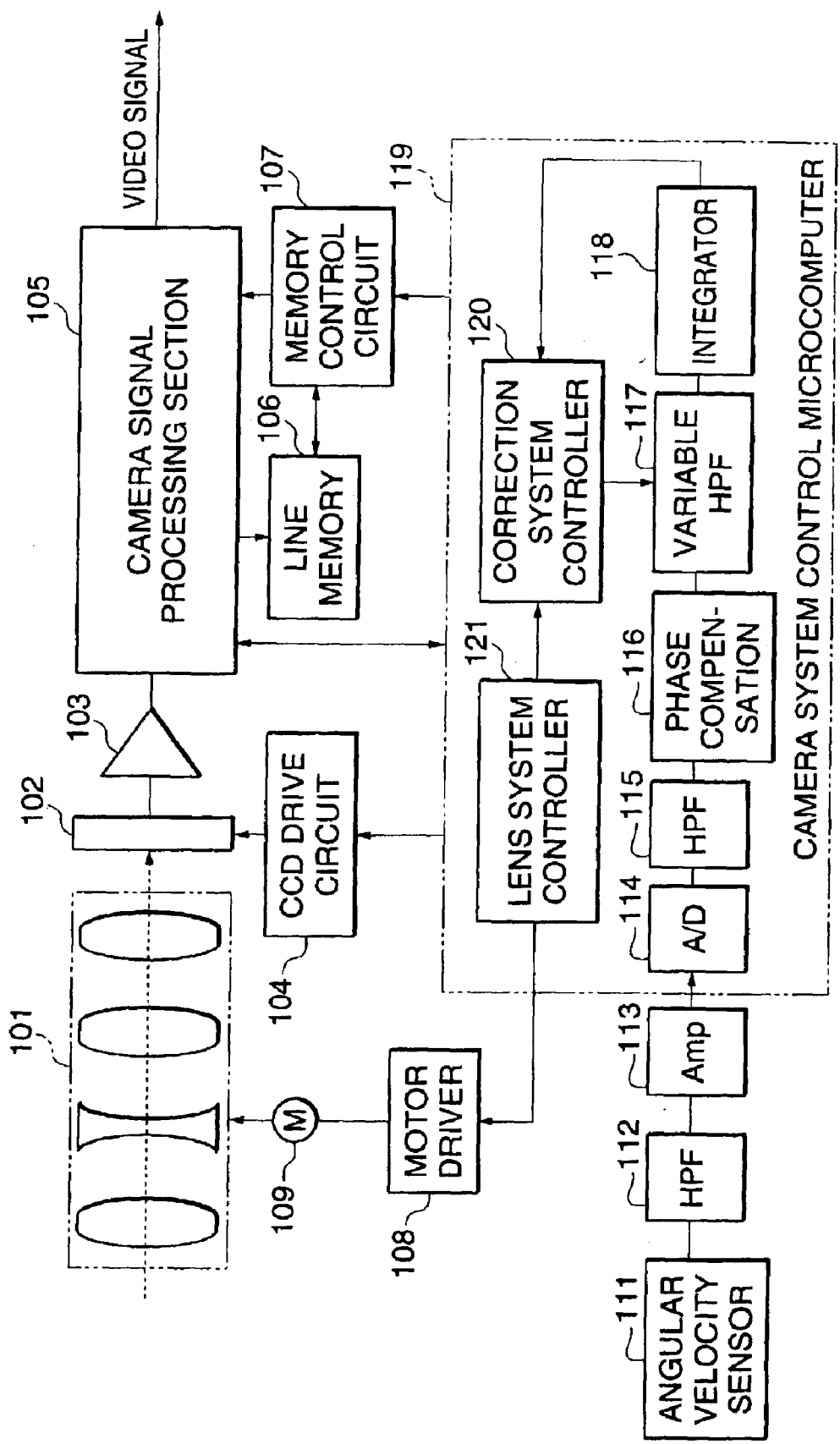
FIG. 1 is a block diagram showing the configuration of an image pickup apparatus according to a first embodiment of the present invention.

FIG. 1 is a block diagram showing the configuration of an image pickup apparatus according to a first embodiment of the present invention. The image pickup apparatus according to the present embodiment is comprised of a lens unit 101, a CCD 102, an analog signal processing section 103, a CCD drive circuit 104, a camera signal processing section 105, a line memory 106, a memory control circuit 107, a motor driver 108, a zoom motor 109, an angular velocity sensor 111, a high pass filter (HPF) 112, an amplifier 113, and a camera system control microcomputer 119. Further, the camera system control microcomputer 119 is comprised of an A/D converter 114, a high pass filter (HPF) 115, a phase compensation filter 116, a variable high pass filter (HPF) 117 that is variable in cutoff frequency, an integrator 118, a correction system controller 120, and a lens system controller 121. Description of the configurations of the elements in FIG. 1 is omitted, as it has been described above.

Figure 2:
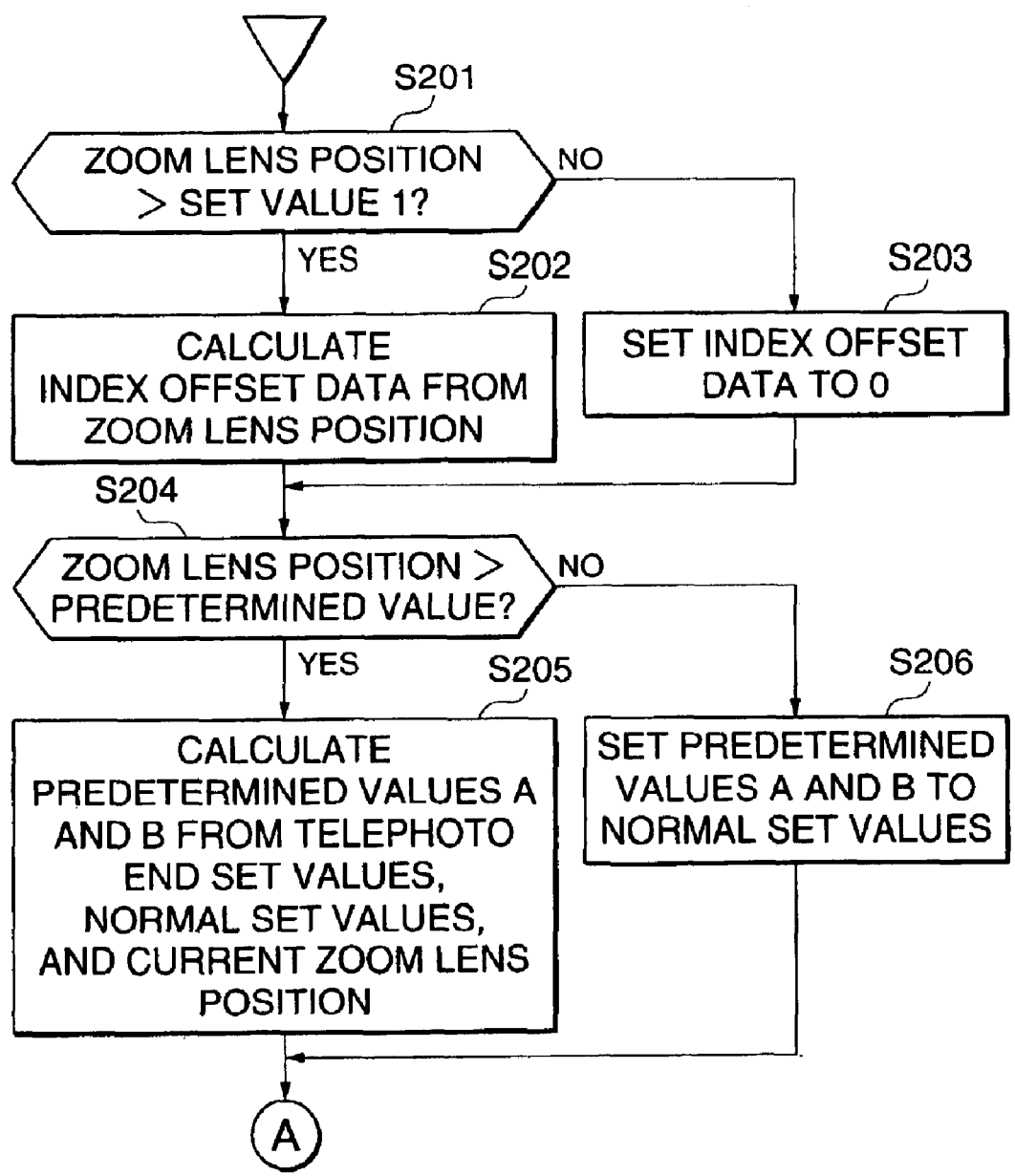
FIG. 2 is a flowchart showing image stabilizing control by a camera system control microcomputer 119 of the image pickup apparatus in FIG. 1.
Figure 3:
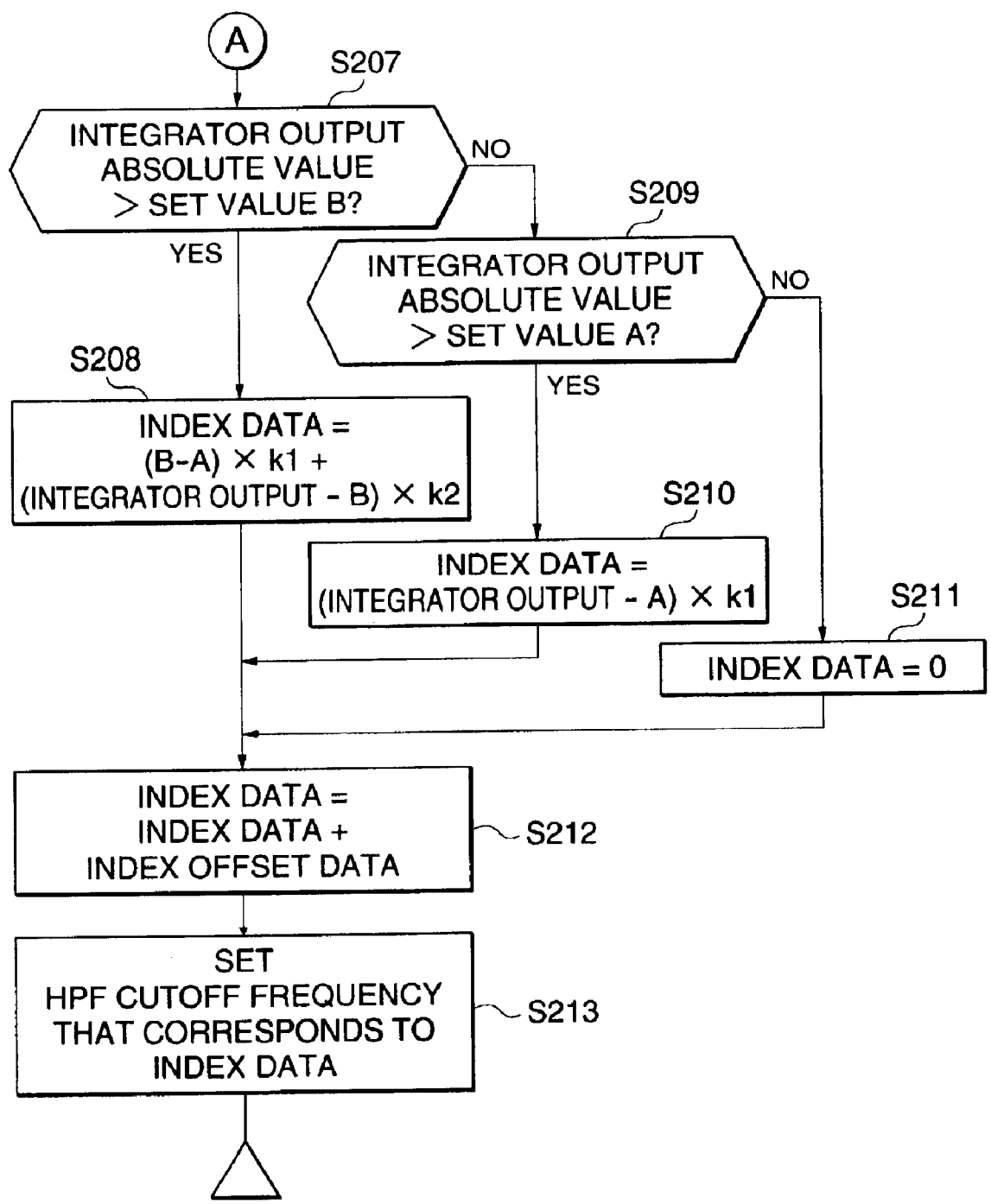
FIG. 3 is a flowchart showing a continued part of the flowchart of FIG. 2.

Next, the operation of the image pickup apparatus in FIG. 1 will be described in detail with reference to FIG. 2 to FIG. 5. FIG. 2 and FIG. 3 are a flowchart showing image stabilizing control that is executed by the camera system control microcomputer 119 of the image pickup apparatus in FIG. 1, and show an operation of varying the HPF cutoff frequency including panning control.

In the flowchart shown in FIG. 2 and FIG. 3, it is determined in step S201 whether the position of the zoom lens of the lens unit 101 of the image pickup apparatus is greater than a set value 1 that is set in advance. If the zoom lens position is greater than the set value 1, then index offset data for the HPF cutoff frequency according to the zoom lens position is calculated in step S202. The index offset data means the amount of shift by which the HPF cutoff frequency during normal control is to be shifted from the HPF cutoff frequency set value in the conventional example, according to a zoom lens position greater than the set value 1. If the zoom lens position is equal to or below the set value 1, then the index offset data for the HPF cutoff frequency is set to 0 in step S203, that is, set to the index data for normal operation.

The calculation of the index offset data in step S202 is carried out according to the following equation, wherein a set value of the index offset data at the telephoto end is designated by fct, the index offset data during normal operation by fcn, the zoom lens position at the telephoto end by zpt, the set value 1 by zpn, and the current zoom lens position by zp:

$$\text{Index offset data} = (fct-fcn) \times (zpt-zp)/(zpt-zpn) + fcn. \quad (5)$$

The set value fct of the index offset data at the telephoto end and the index offset data fan during normal operation are given by data stored in advance in an EEPROM, not shown, connected to the camera system control microcomputer 119, and are variable according to the magnification ratio of the zoom lens. The result of the calculation according to the above expression 5 is stored as index offset data set according to the zoom lens position.

Figure 16:
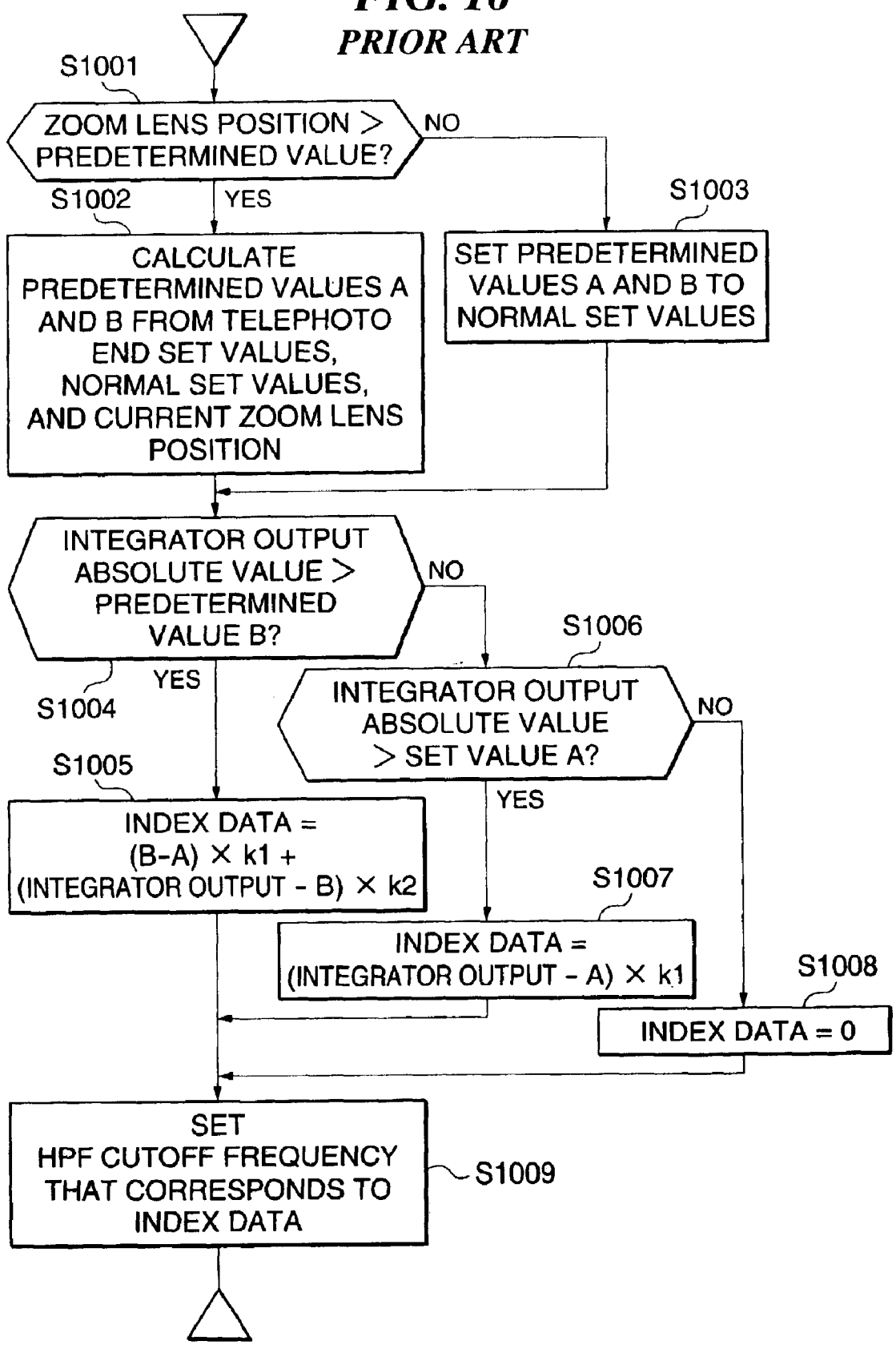
FIG. 16 is a flowchart showing a panning control process executed by the image pickup apparatus.
Figure 17:
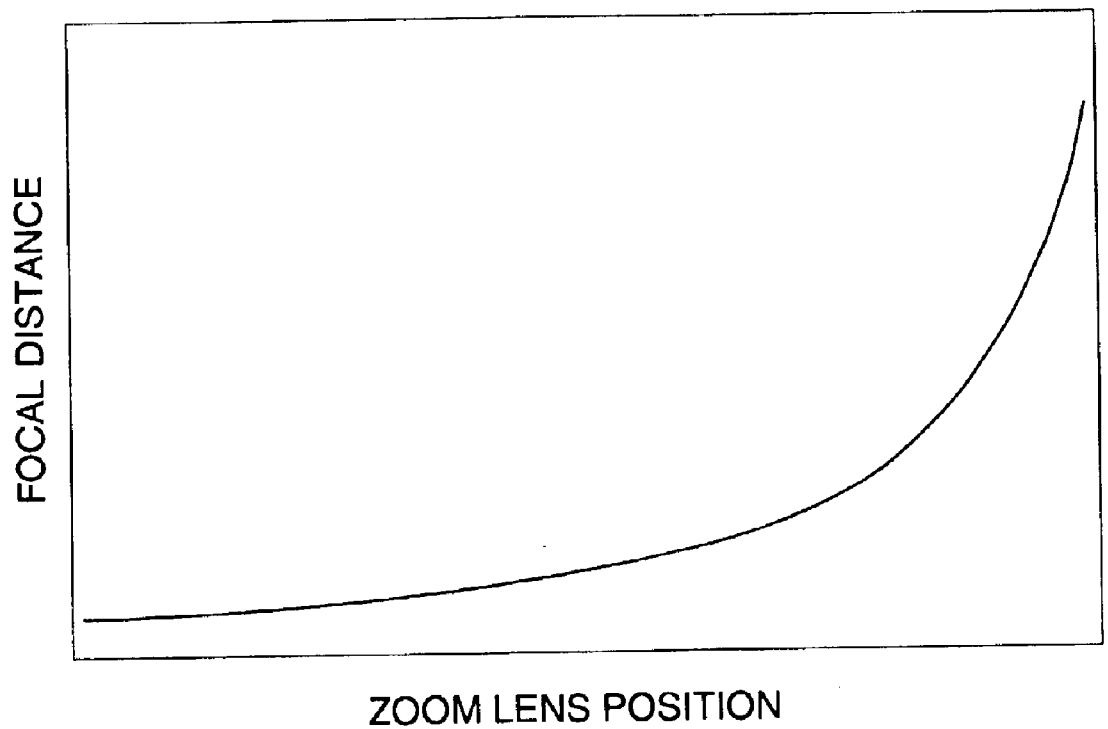
FIG. 17 is a diagram showing the relationship between the position of a zoom lens and the focal distance of the zoom lens of the image pickup apparatus.
Figure 18:
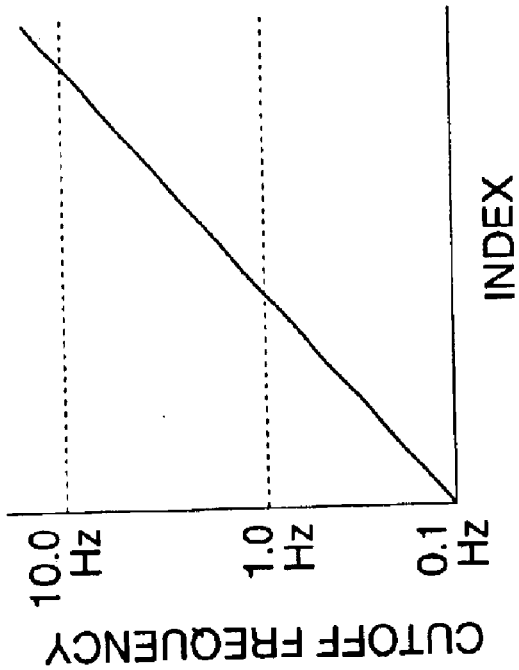
Figure 19:
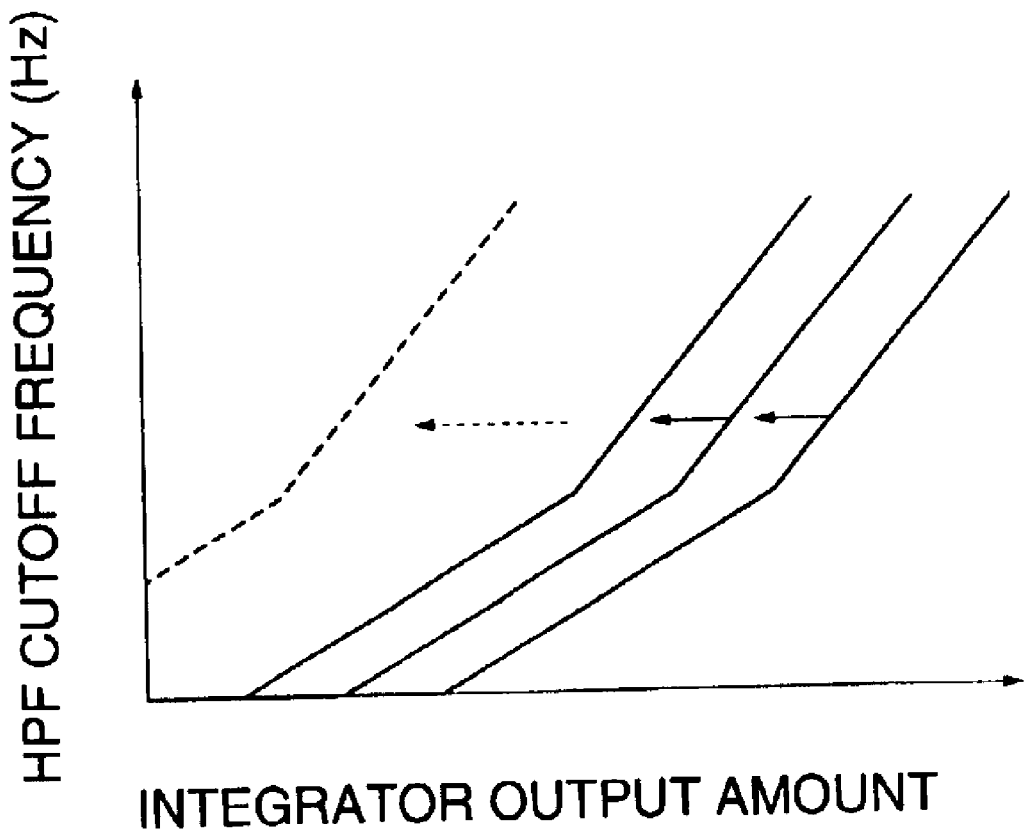
FIG. 19 is a diagram showing the relationship between the output from the integrator and the HPF cutoff frequency in panning control of the image pickup apparatus.

Steps S204 to S211 are the same as steps S1001 to S1008 in FIG. 16 in the conventional panning control process described above, for executing the same processing as the latter. In step S212, the index data obtained by the panning control process and the index offset data that has been set in step S202 or S203 described above are added together to set final index data. Then, a HPF cutoff frequency that corresponds to the final index data thus obtained is set in step S213.

Figure 4:
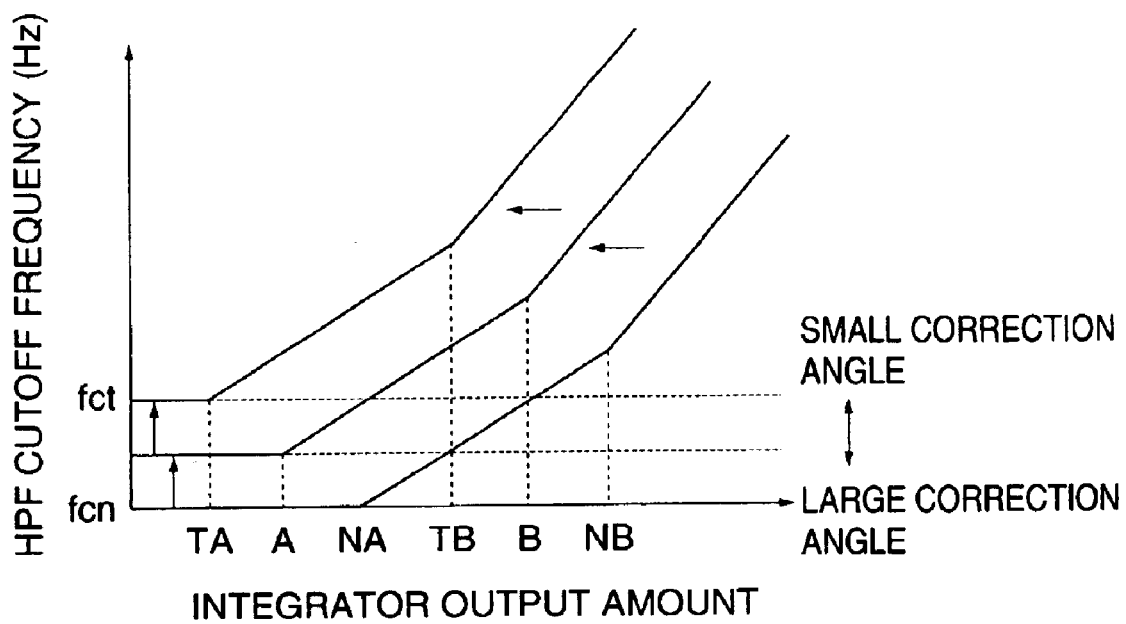
FIG. 4 is a diagram showing the relationship between the amount of an output from an integrator and a HPF cutoff frequency in the image pickup apparatus in FIG. 1.
Figure 5:
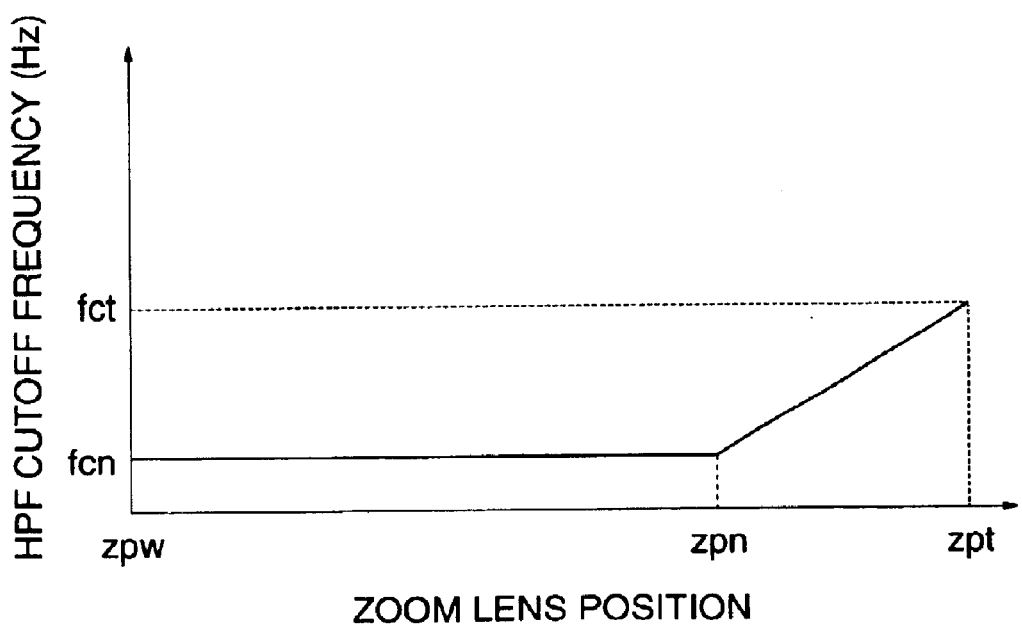
FIG. 5 is a diagram showing the relationship between the position of a zoom lens and the HPF cutoff frequency in the image pickup apparatus in FIG. 1.

The HPF cutoff frequency is set as shown in FIG. 4 by the above described operation. The HPF cutoff frequency that corresponds to the index offset data that is set by the operation in steps S201 to S203 described above has a characteristic variable according to the zoom lens position, as shown in FIG. 5. In FIG. 5, symbol zpw represents the position of the wide end of the zoom lens. By giving the characteristic shown in FIG. 5 to the HPF cutoff frequency, it is possible to restrict the correction amount if the focal distance of the zoom lens is very long and the correction angle is small. As a result, the phenomenon that the extracting gets fixed to a correction limit (the state that the extracting gets fixed to a peripheral edge of the entire image pickup area of the CCD during electronic shake correction by area extraction) and consequently image stabilization cannot be reliably achieved can be avoided during normal control as well as during panning control.

On the other hand, if the focal distance of the zoom lens is short enough and the maximum correction angle can securely be applied to actual correction, similar control to the conventional control is enabled over the entire focal distance by setting the set value 1 in step S201 described above to the zoom lens position at the telephoto end, or by setting the set value fct of the index offset data at the telephoto end to the same as the value of data used for normal operation. Accordingly, if the control according to the present invention is applied to an image pickup apparatus, optimum image stabilizing control can be realized irrespective of whether a zoom lens with a long focal distance or a zoom lens with a short focal distance is used.

According to the first embodiment of the present invention, as described above, in an image pickup apparatus such as a video camera that is provided with a hand shake correction function, satisfactory image pickup can be realized without giving any strange feeling to the photographer even when the correction angle is very small due to high magnification.

Figure 6:
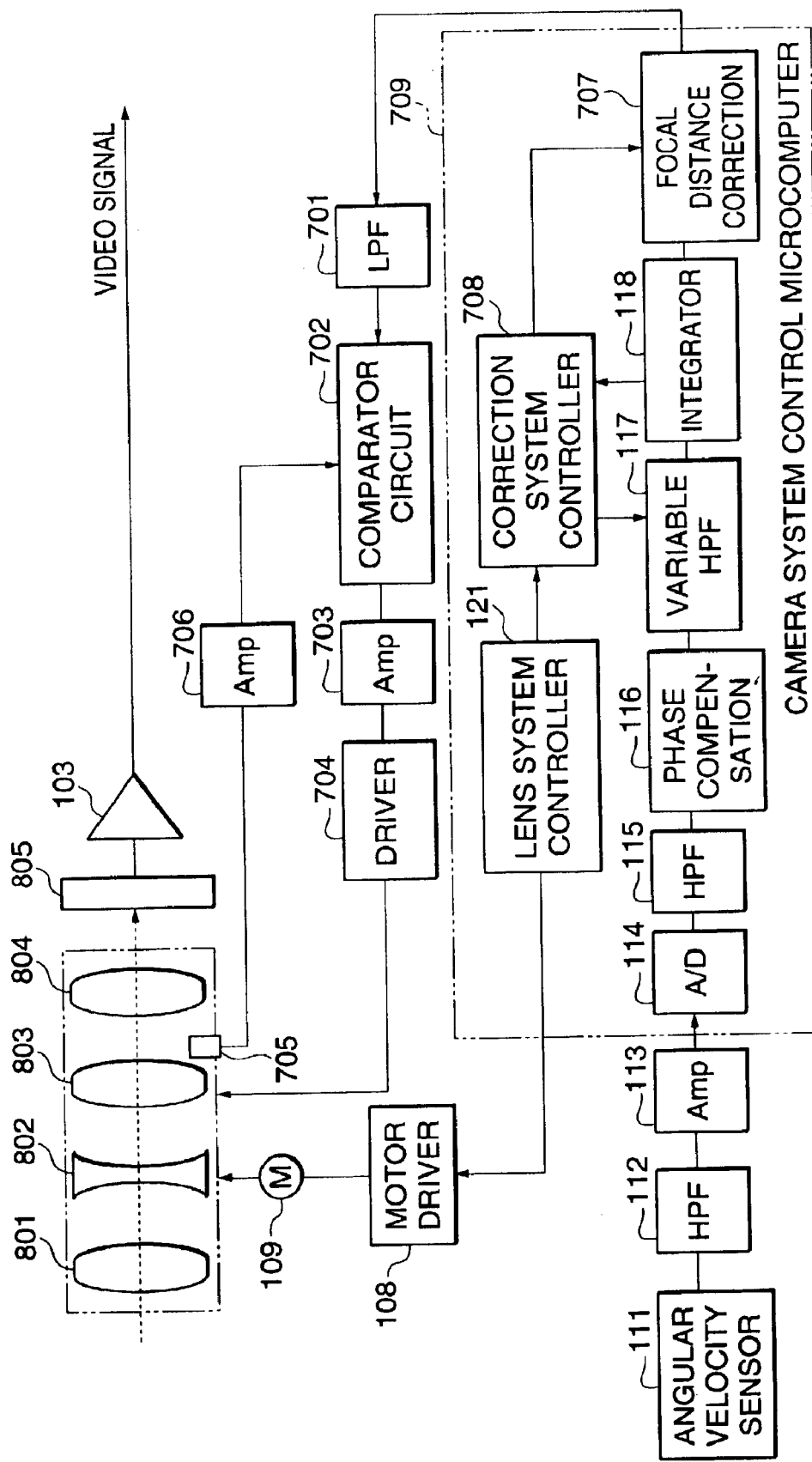
FIG. 6 is a block diagram showing the configuration of an image pickup apparatus according to a second embodiment of the present invention.
Figure 14:
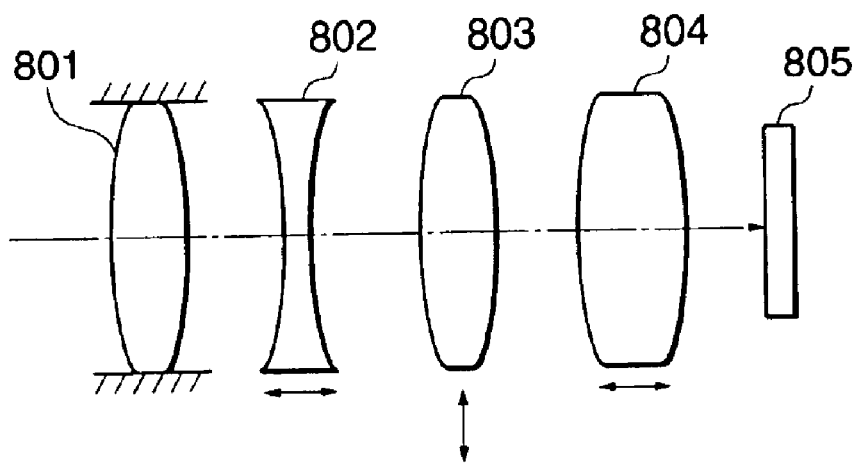
FIG. 14 is a diagram showing the configuration of groups of lenses of the optical shake correcting system of the image pickup apparatus.

FIG. 6 is a block diagram showing the configuration of an image pickup apparatus according to a second embodiment of the present invention. The image pickup apparatus of the present invention is different from the image pickup apparatus in FIG. 1 in that the shake correction block employs an optical correction system instead of an electronic correction system as employed in the first embodiment. The image pickup apparatus according to the present embodiment is comprised of a fixed lens 801, a zoom lens 802, a shift lens 803, a focus compensation lens 804, a CCD 805, a low pass filter (LPF) 701, a comparator circuit 702, an amplifier 703, a driver 704, a sensor 705, an amplifier 706, a motor driver 108, a zoom motor 109, an angular velocity sensor 111, a high pass filter (HPF) 112, an amplifier 113, and a camera system control microcomputer 709. Further, the camera system control microcomputer 709 is comprised of an A/D converter 114, a high pass filter (HPF) 115, a phase compensation filter 116, a variable high pass filter (HPF) 117 that is variable in cutoff frequency, an integrator 118, a focal distance correcting section 707, a correction system controller 708, and a lens system controller 121. In FIG. 6, elements and parts corresponding to those in FIGS. 1 and 14 are designated by identical reference numerals, description of which is omitted.

In FIG. 6, the low pass filter (LPF) 701 subjects an output signal obtained by PWM (Pulse Width Modulation) or the like from the camera system control microcomputer 709 to digital-to-analog conversion. The comparator circuit 702 compares an output signal from the low pass filter 701 and an output signal from the amplifier 706 to output a signal according to the comparison result to the amplifier 703. The amplifier 703 amplifies the output signal from the comparator circuit 702. The driver 704 drives the shift lens 803. The sensor 705 detects the position of the shift lens 803. The amplifier 706 amplifies an output from the sensor 705. The focal distance correction section 707 corrects an output from the integrator 118 according to the focal distance. The correction system controller 708 performs correction control described later.

In the second embodiment, the lens unit composed of the fixed lens 801, the zoom lens 802, the shift lens 803, and the focus compensation lens 804 makes it a prerequisite that the correction angle is sacrificed due to miniaturization. The lens unit used here is assumed to be designed such that the correction angle at the telephoto end is, for example, 0.12 degrees.

Figure 7:
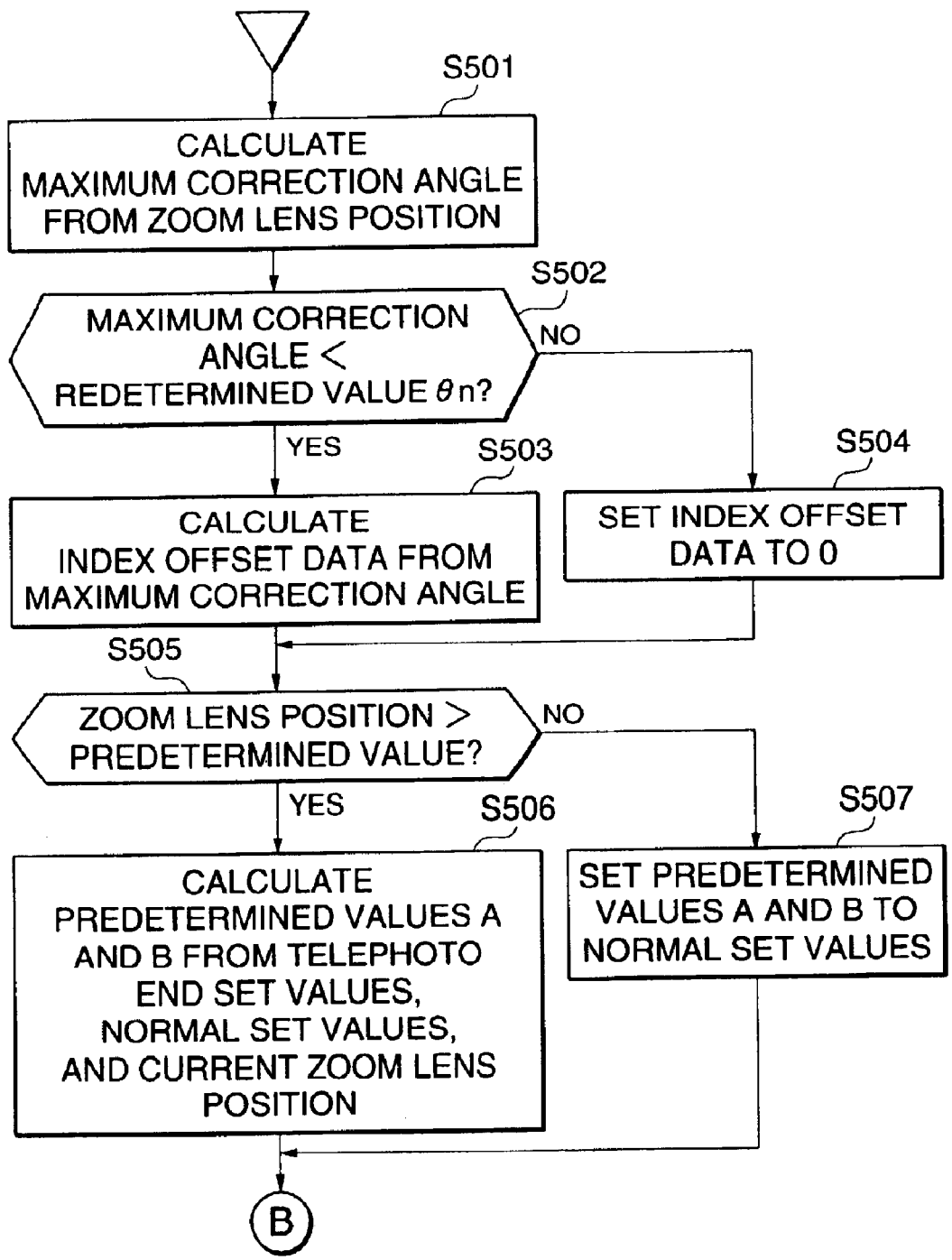
FIG. 7 is a flowchart showing image stabilizing control by a camera system control microcomputer 119 of the image pickup apparatus in FIG. 6.
Figure 8:
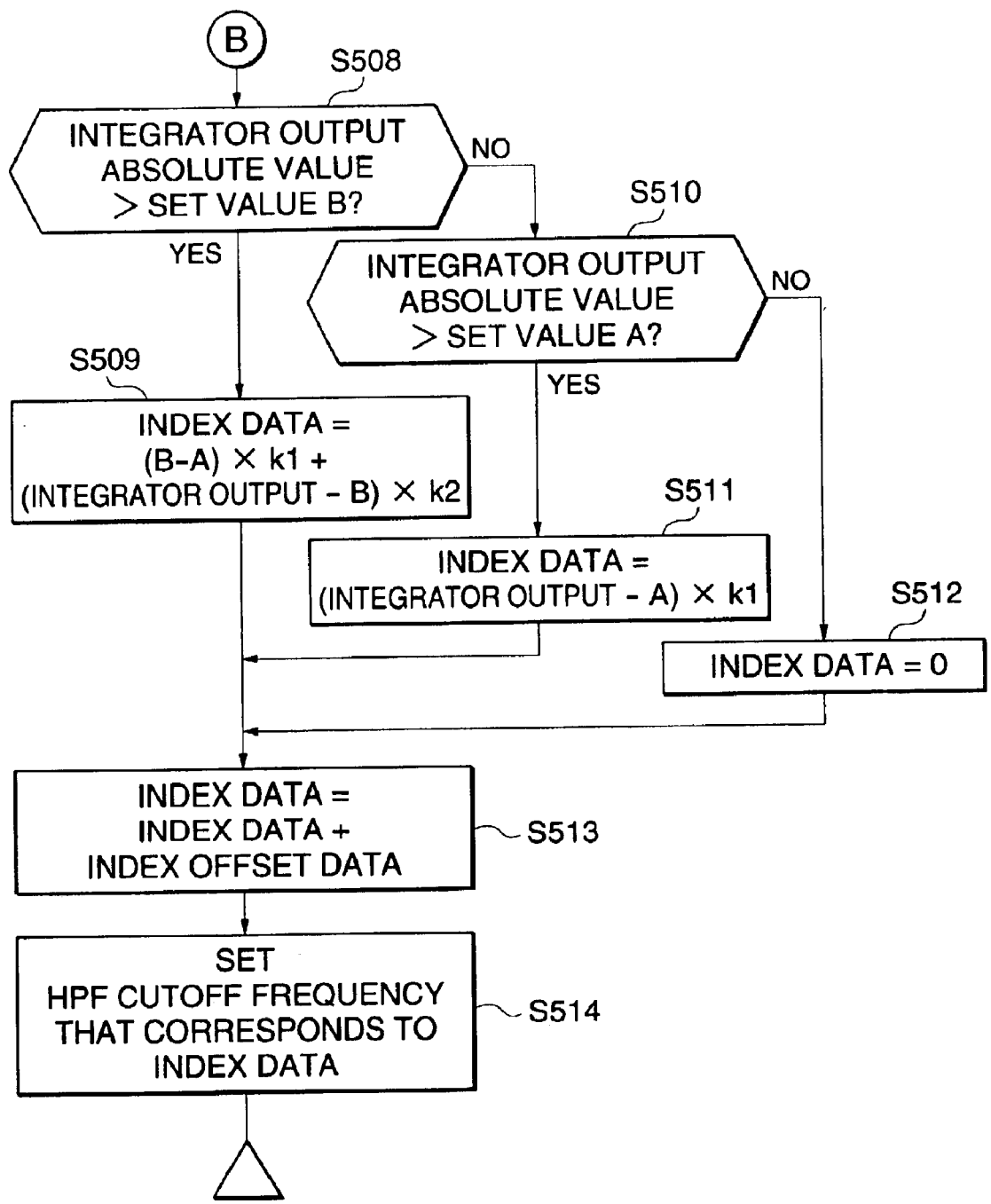
FIG. 8 is a flowchart showing a continued part of the flowchart of FIG. 6.
Figure 9:
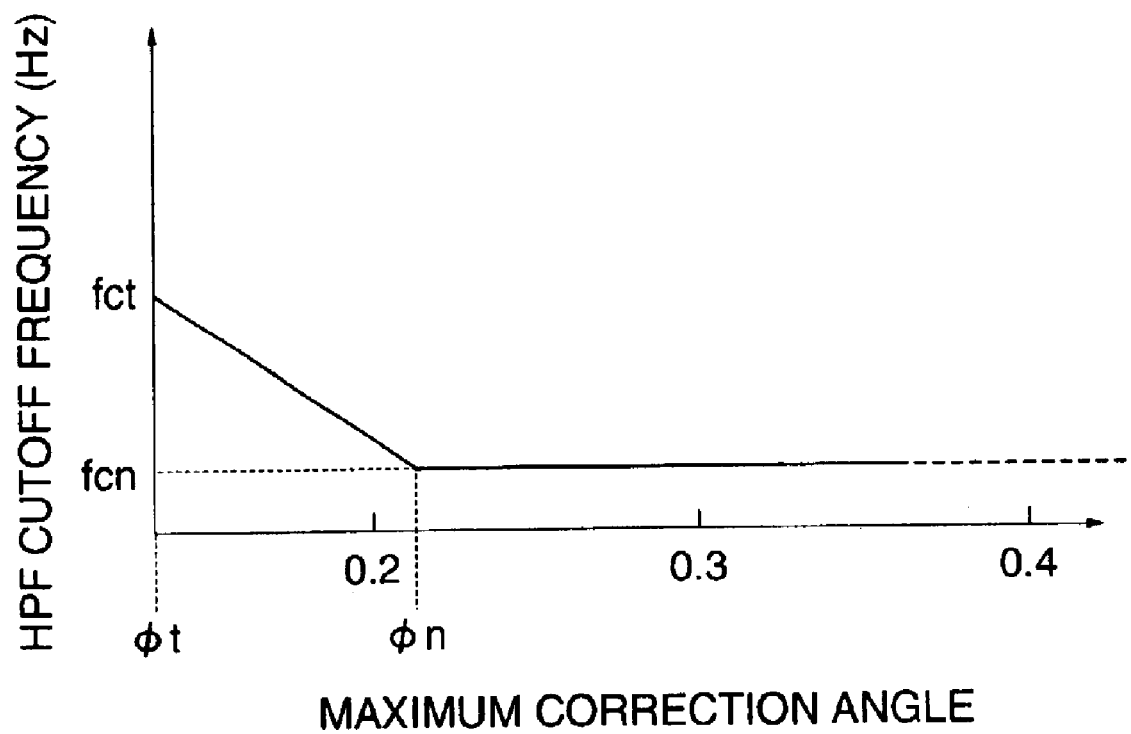
FIG. 9 is a diagram showing the relationship between the maximum correction angle and the HPF cutoff frequency in the image pickup apparatus in FIG. 6.

Next, the operation of the image pickup apparatus in FIG. 6 will be described in detail with reference to FIGS. 7 to 9. FIG. 7 and FIG. 8 are a flowchart showing image stabilizing control executed by the camera system control microcomputer 709 of the image pickup apparatus in FIG. 6, and show an operation of varying the HPF cutoff frequency including panning control.

In the flowchart shown in FIG. 7 and FIG. 8, in step S501, the correction system controller 708 calculates the maximum angle according to the zoom lens position that is output from the lens system controller 121. Since the focal distance is derived from the zoom lens position as described above, the maximum correction angle is calculated according to the ratio in percentage of the focal distance at the current zoom lens position to the focal distance at the telephoto end. If the focal distance is at 60%, then $$\text{Current maximum correction degree} = 0.12 \div 0.6 = 0.20 \text{ (degrees)}. \quad (6)$$

Next, in step S502, it is determined whether the maximum correction angle is smaller than a set value θn that is set in advance. If the maximum correction angle is smaller than the set value θn, then the index offset data for the HPF cutoff frequency is calculated according to the maximum correction angle in step S503. If the maximum correction angle is equal to or greater than the set value θn, then the index offset data is set to 0 in step S504.

Steps S505 to S512 are the same as steps S1001 to S1008 in FIG. 16 in the conventional panning control process described above, for executing the same process as the latter. In step S513, the index data obtained by the panning control process and the offset value of the index data that has been set in step S503 or S504 described above are added together to set final index data. Then, a HPF cutoff frequency that corresponds to the final index data thus obtained is set in step S514.

The HPF cutoff frequency is set as shown in FIG. 4, similarly to the first embodiment described above, with the above described operation. The HPF cutoff frequency that corresponds to the index offset data that is set by the operation in steps S502 to S504 described above has a characteristic variable according to the maximum correction angle, as shown in FIG. 9. In FIG. 9, symbol θt represents the maximum correction angle at the telephoto end. By giving the characteristic shown in FIG. 9 to the HPF cutoff frequency, it is possible to restrict the correction amount if the correction angle is small. As a result, the phenomenon that the extracting gets fixed to a correction limit (the state that the shift lens cannot be shifted any more in the lens barrel in the optical shake correction by the shift lens) and consequently image stabilization cannot be reliably achieved can be avoided during normal control as well as during panning control.

Although the second embodiment has been described with regard to the optical shake correction by the shift lens 803, the maximum correction angle can be calculated even in the electronic shake correction as well as in the optical shake correction to perform control according to the maximum correction angle.

According to the second embodiment of the present invention, as described above, in an image pickup apparatus such as a video camera that is provided with a hand shake correction function, satisfactory image pickup can be realized without giving any strange feeling to the photographer even when the correction angle is very small due to high magnification.

Figure 10:
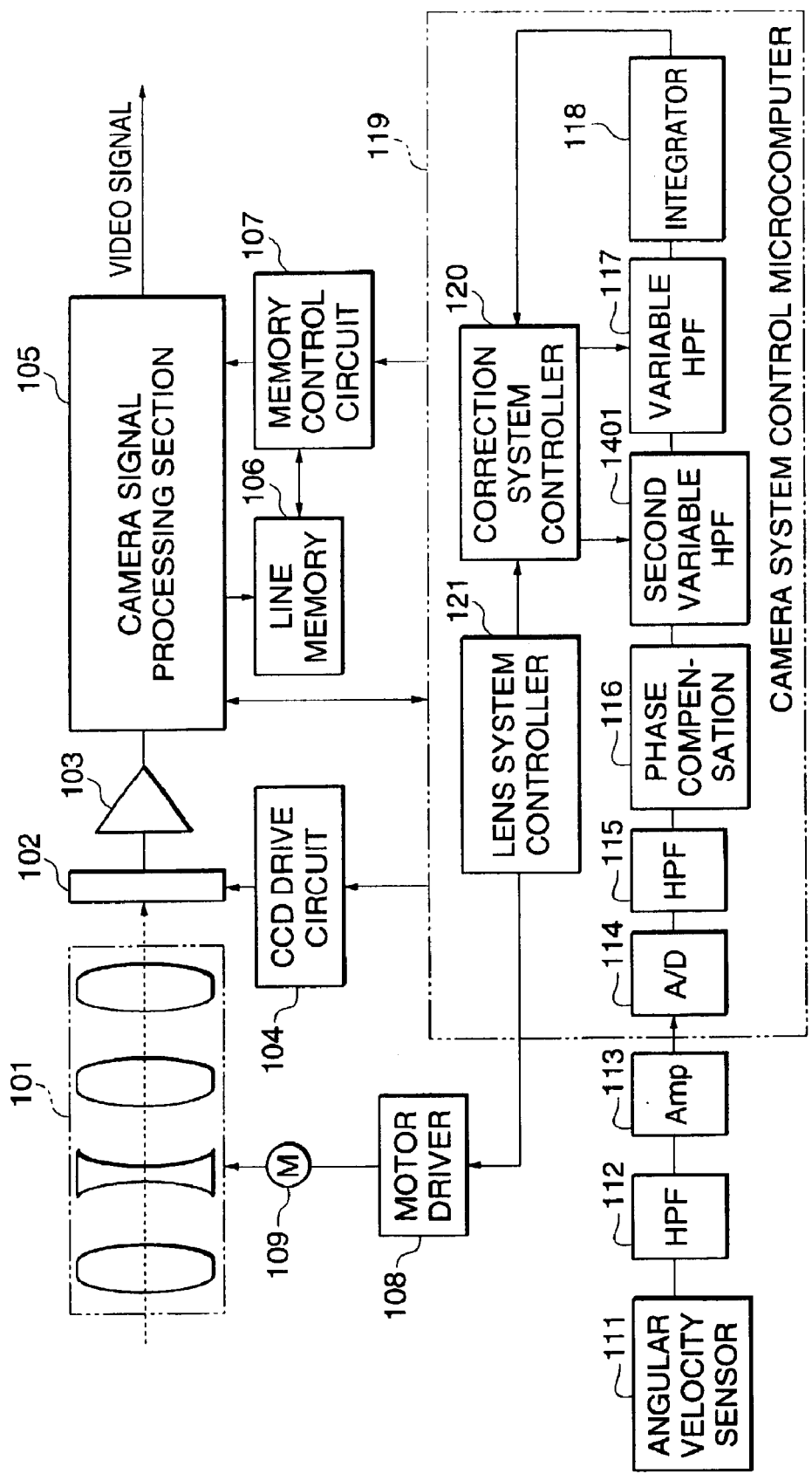
FIG. 10 is a block diagram showing the configuration of an image pickup apparatus according to a third embodiment of the present invention.

FIG. 10 is a block diagram showing the configuration of an image pickup apparatus according to a third embodiment of the present invention. The image pickup apparatus according to the present embodiment is comprised of a lens unit 101, a CCD 102, an analog signal processing section 103, a CCD drive circuit 104, a camera signal processing section 105, a line memory 106, a memory control circuit 107, a motor driver 108, a zoom motor 109, an angular velocity sensor 111, a high pass filter (HPF) 112, an amplifier 113, and a camera system control microcomputer 119. Further, the camera system control microcomputer 119 is comprised of an A/D converter 114, a high pass filter (HPF) 115, a phase compensation filter 116, a second variable high pass filter (HPF) 1401 that is variable in cutoff frequency, a variable high pass filter (HPF) 117 that is variable in cutoff frequency, an integrator 118, a correction system controller 120, and a lens system controller 121. In FIG. 10, elements and parts corresponding to those in FIG. 1 are designated by identical reference numerals, description of which is omitted.

Figure 15:
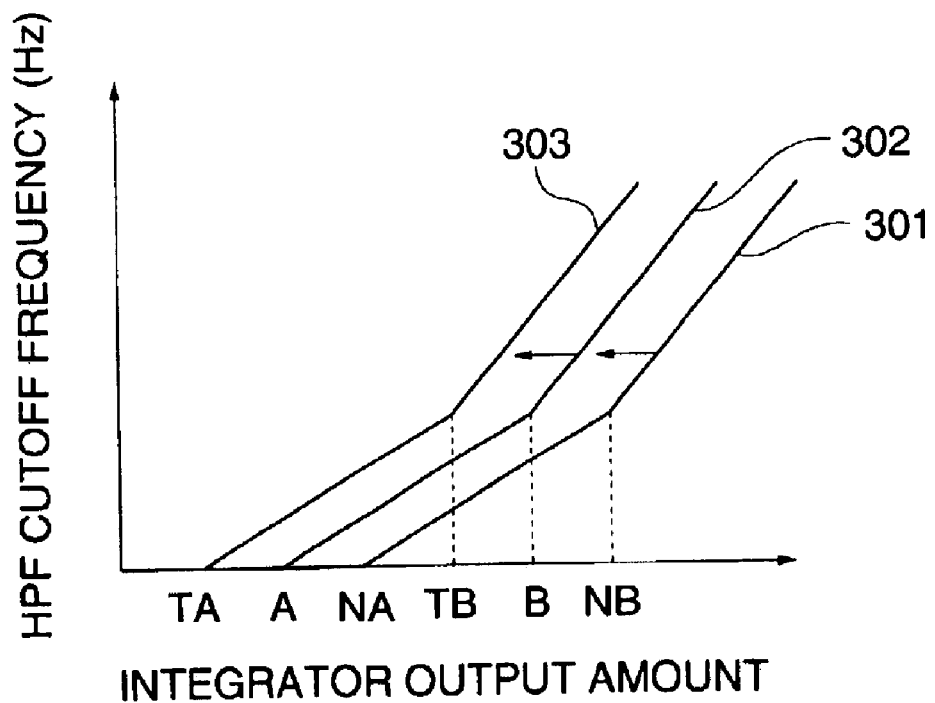
FIG. 15 is a diagram showing the relationship between an output from an integrator and the HPF cutoff frequency in panning control of the image pickup apparatus.

In FIG. 10, the camera system control microcomputer 119 is characterized by having the second variable HPF 1401 in addition to the conventional variable HPF 117. The variable HPF 117 performs the conventional panning control process, and the second HPF 1401 changes the HPF cutoff frequency according to the focal distance or the maximum correction angle, wherein the HPF cutoff frequency of the variable HPF 117 is changed as shown in FIG. 15, and the HPF cutoff frequency of the second variable HPF 1401 is changed as shown in FIG. 5 or FIG. 9 described above.

According to the third embodiment, by virtue of the above configuration, effects similar to those in the first embodiment and in the second embodiment can be obtained by the above described configuration. That is, in the case that the focal distance of the zoom lens is long and the correction angle is small, the phenomenon that the extracting gets fixed to a correction limit (the state that the extracting area gets fixed to a peripheral edge of the entire image pickup area of the CCD during electronic shake correction by area extraction) and consequently image stabilization cannot be reliably achieved can be avoided.

According to the third embodiment of the present invention, as described above, in an image pickup apparatus such as a video camera that is provided with a hand shake correction function, satisfactory image pickup can be realized without giving any strange feeling to the photographer even when the correction angle is very small due to high magnification.

Figure 11:
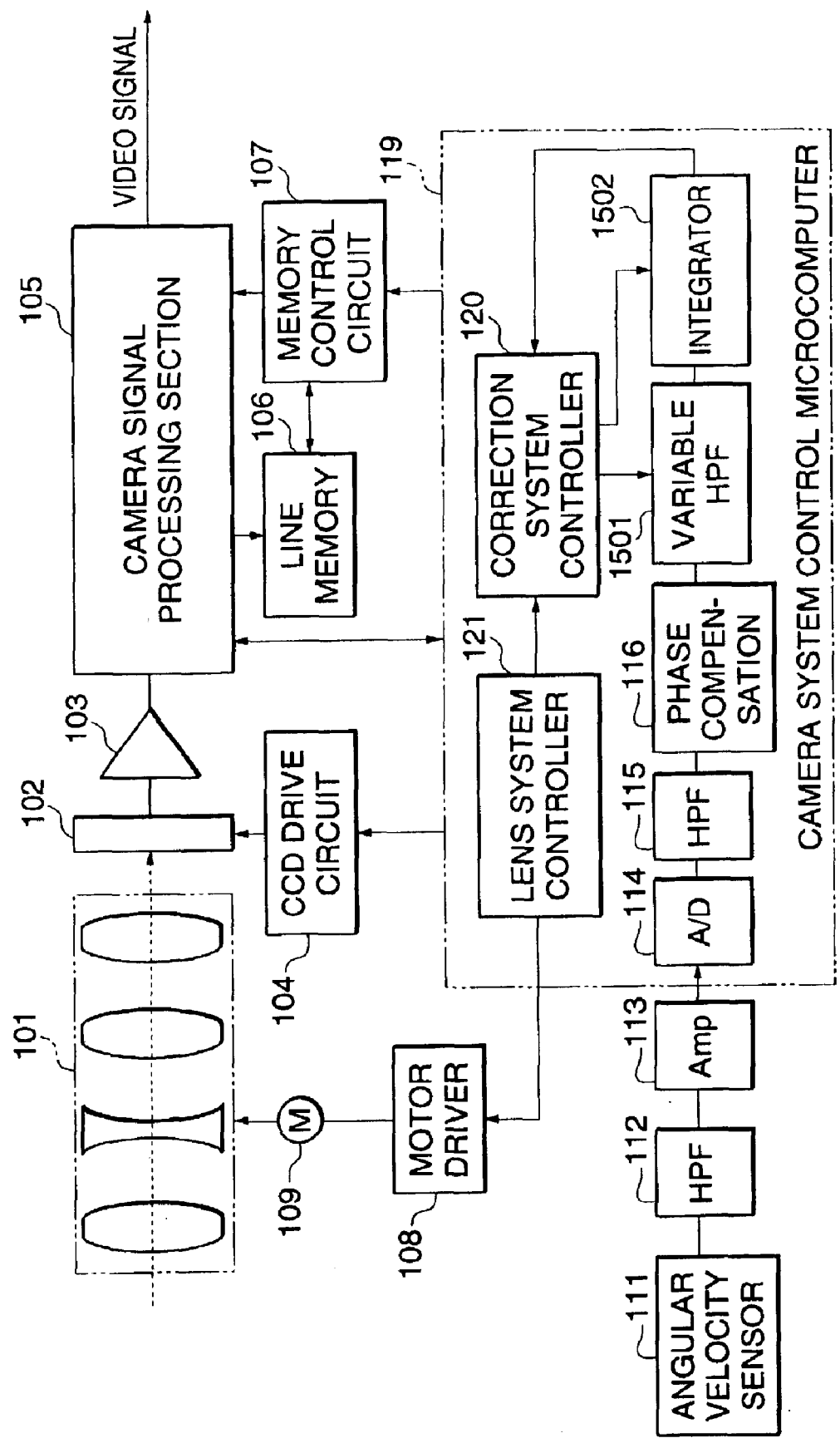
FIG. 11 is a block diagram showing the configuration of an image pickup apparatus according to a fourth embodiment of the present invention.

FIG. 11 is a block diagram showing the configuration of an image pickup apparatus according to a fourth embodiment of the present invention. The image pickup apparatus according to the present embodiment is comprised of a lens unit 101, a CCD 102, an analog signal processing section 103, a CCD drive circuit 104, a camera signal processing section 105, a line memory 106, a memory control circuit 107, a motor driver 108, a zoom motor 109, an angular velocity sensor 111, a high pass filter (HPF) 112, an amplifier 113, and a camera system control microcomputer 119. Further, the camera system control microcomputer 119 is comprised of an A/D converter 114, a high pass filter (HPF) 115, a phase compensation filter 116, a variable high pass filter (HPF) 1501 that can change the cutoff frequency, an integrator 1502, a correction system controller 120, and a lens system controller 121. In FIG. 11, elements and parts corresponding to those in FIG. 1 are designated by identical reference numerals, description of which is omitted.

In FIG. 11, the image pickup apparatus performs panning control by changing the integration constant of the integrator 1502, and changes the HPF cutoff frequency according to the focal distance or the correction angle by the variable HPF 1501.

Figure 12:
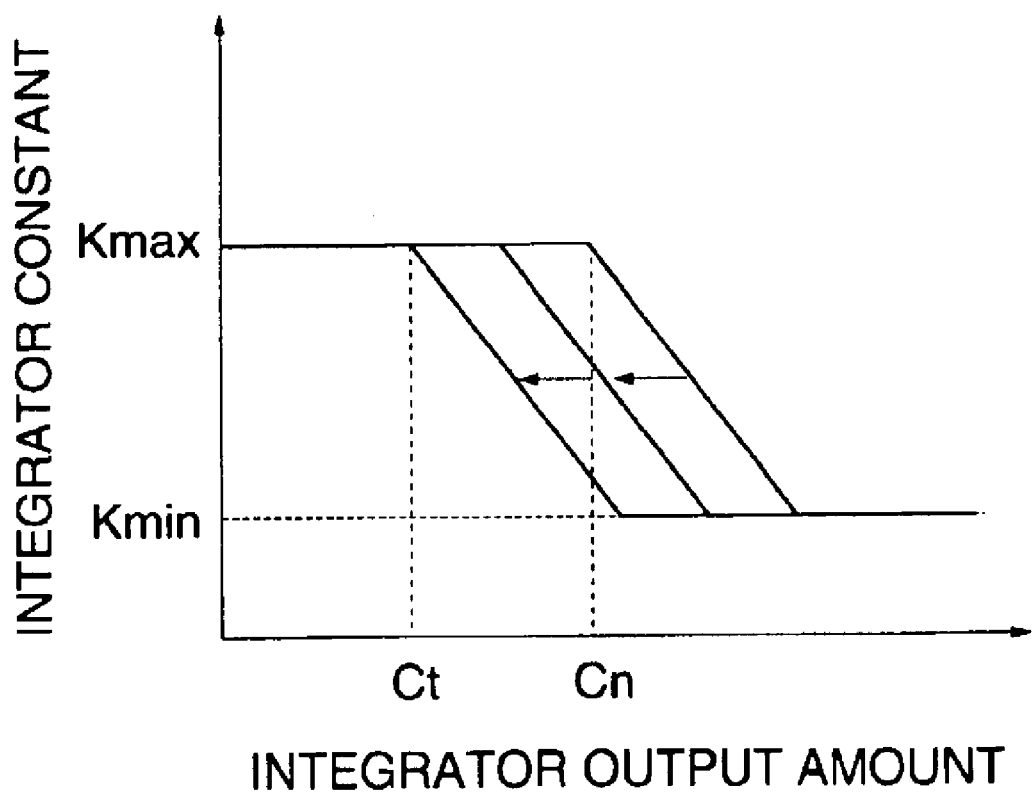
FIG. 12 is a diagram showing the relationship between the output from an integrator and an integration constant of the integrator in the image pickup apparatus in FIG. 11.
Figure 13:
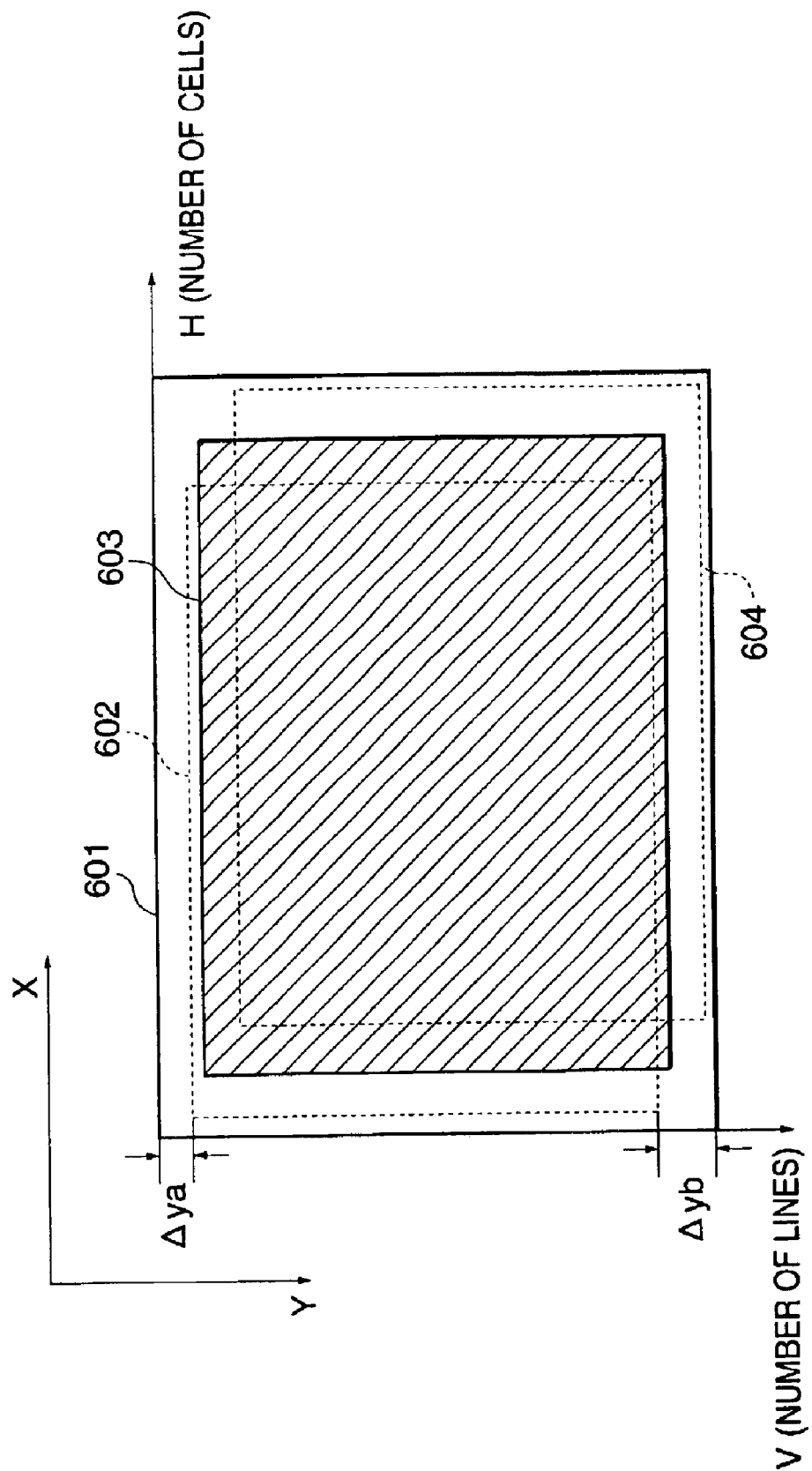
FIG. 13 is a schematic diagram showing an image of an image pickup area of an image pickup element of an electronic shake correction system of an image pickup apparatus.

The integration constant of the integrator 1502 changes according to the amount of the output from the integrator, as shown in FIG. 12. In FIG. 12, symbol Kmax represents a value of the integration constant during normal operation, Kmin represents the minimum value of the integration constant, Ct represents the changing point of the integration constant at the telephoto end according to the amount of the output from the integrator, and Cn represents the changing point of the integration constant with the focal distance equal to or below a predetermined value. Since gain in the low frequency range drops if the value of the integration constant becomes smaller, panning control is enabled by giving the characteristic shown in FIG. 12 to the integration constant, as is the case with the changing of the HPF cutoff frequency described above. Then, effects similar to those in the first through third embodiments can be obtained by giving the characteristic shown in FIG. 5 or FIG. 9 described above to the variable HPF 1501.

According to the fourth embodiment, by virtue of the above configuration, in the case that the focal distance of the zoom lens is long and the correction angle is small, the phenomenon that the extracting area gets fixed to a correction limit (the state that the extracting area gets fixed to a peripheral edge of the entire image pickup area of the CCD during electronic shake correction by area extraction) and consequently image stabilization cannot be reliably achieved can be avoided.

As described above, according to the fourth embodiment of the present invention, in an image pickup apparatus such as a video camera that is provided with a hand shake correction function, satisfactory image pickup can be realized without giving any strange feeling to the photographer even when the correction angle is very small due to high magnification.

In the first through fourth embodiments, examples have been given in which the present invention is applied to a single image pickup apparatus. The present invention, however, is not limited to these examples, and it is possible to apply the invention to any system which is comprised of an image pickup apparatus according to the invention, and a display unit such as a liquid crystal display and/or an information processing apparatus such as a personal computer, and in which they are connected with each other for image communication therebetween.

The present invention may either be applied to a system composed of a plurality of apparatuses or to a single apparatus. It is to be understood that the object of the present invention may also be accomplished by supplying a system or an apparatus with a storage medium in which a program code of software realizes the functions of any of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the storage medium storing the program code constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, a ROM, and a download via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image-shake correcting device for an image pickup apparatus having an optical image forming unit that forms an image, comprising:
   a detecting unit that detects a shake of the image-shake correcting device;
   a filter circuit that cuts off low frequency components of a detection signal output from said detecting unit, said filter circuit being variable in cutoff frequency;
   a panning determining circuit that determines whether or not panning of the image pickup apparatus is being carried out, according to the detection signal output from said detecting unit;
   a first control circuit that provides control to change the cutoff frequency of said filter circuit according to results of the determination by said panning determining circuit;
   a second control circuit that provides control to change a minimum frequency of a range of the cutoff frequency of said filter circuit to be changed by said first control circuit in a manner such that the minimum frequency is higher as a focal distance of said optical image forming unit is longer while the focal distance is above a predetermined value; and
   a signal processing circuit that carries out signal processing for performing an image-shake correcting operation on an image signal output from said optical image forming unit, according to the detection signal having the low frequency components cut off by said filter circuit.

2. An image-shake correcting device according to claim 1, comprising an image pickup element that converts an image formed by said optical image forming unit into an electrical signal, and a signal control circuit that controls the electrical signal according to the signal processing carried out by said signal processing circuit.

3. An image-shake correcting device according to claim 1, comprising an optical correcting unit that corrects an image shake, and a drive control unit that controls driving of said optical image forming unit according to the signal processing carried out by said signal processing circuit.

4. An image-shake correcting device for an image pickup apparatus having an optical image forming unit that forms an image, comprising:

a detecting unit that detects a shake of the image-shake correcting device;

a filter circuit that cuts off low frequency components of a detection signal output from said detecting unit, said filter circuit being variable in cutoff frequency;

a producing circuit that produces a maximum correction angle for correcting an image shake, according to a focal distance of said optical image forming unit;

a panning determining circuit that determines whether or not panning of the image pickup apparatus is being carried out, according to the detection signal output from said detecting unit;

a first control circuit that that provides control to change the cutoff frequency of said filter circuit according to results of the determination by said panning determining circuit;

a second control circuit that provides control to change a minimum frequency of a range of the cutoff frequency of said filter circuit to be changed by said first control circuit in a maimer such that the minimum frequency is higher as the maximum correction angle produced by said producing circuit is smaller while it is below the predetermined angle; and a signal processing circuit that carries out signal processing for performing an image-shake correcting operation on an image signal output from said optical image forming unit, according to the detection signal having the low frequency components cut off by said filter circuit.

5. An image-shake correcting device according to claim 4, comprising an image pickup element that converts an image formed by said optical image forming unit into an electrical signal, and a signal control circuit that controls the electrical signal according to the signal processing carried out by said signal processing circuit.

6. An image-shake correcting device according to claim 4, comprising an optical correcting unit that corrects an image shake, and a drive control unit that controls driving of said optical image forming unit according to the signal processing carried out by said signal processing circuit.

* * * * *

UNITED STATES PATENT AND TRADEMARK OFFICE
CERTIFICATE OF CORRECTION

PATENT NO. : 6,933,968 B2
APPLICATION NO. : 10/348994
DATED : August 23, 2005
INVENTOR(S) : Tatsuya Yamazaki It is certified that error appears in the above-identified patent and that said Letters Patent is hereby corrected as shown below:

Column 6, line 33, delete "10and" and insert --10 and--

Column 6, line 49, delete "between-the" and insert --between the--

Signed and Sealed this

Fifth Day of December, 2006

JON W. DUDAS
*Director of the United States Patent and Trademark Office*